United States Patent
Bower et al.

(10) Patent No.: US 11,108,903 B2
(45) Date of Patent: Aug. 31, 2021

(54) FLOAT MOBILE

(71) Applicants: Robert W. Bower, Haiku, HI (US);
Wei D. Bower, Haiku, HI (US);
Michael S. Bower, Gilroy, CA (US)

(72) Inventors: Robert W. Bower, Haiku, HI (US);
Wei D. Bower, Haiku, HI (US);
Michael S. Bower, Gilroy, CA (US)

( * ) Notice: Subject to any disclaimer, the term of this patent is extended or adjusted under 35 U.S.C. 154(b) by 0 days.

(21) Appl. No.: 15/795,030

(22) Filed: Oct. 26, 2017

(65) Prior Publication Data
US 2018/0115638 A1   Apr. 26, 2018

Related U.S. Application Data

(60) Provisional application No. 62/413,258, filed on Oct. 26, 2016.

(51) Int. Cl.
| | |
|---|---|
| *A45C 11/00* | (2006.01) |
| *H04M 1/18* | (2006.01) |
| *H04M 1/02* | (2006.01) |
| *H04B 1/3888* | (2015.01) |
| *A45C 13/00* | (2006.01) |
| *H04M 1/04* | (2006.01) |

(52) U.S. Cl.
CPC ............ *H04M 1/18* (2013.01); *A45C 11/00* (2013.01); *A45C 13/008* (2013.01); *H04B 1/3888* (2013.01); *H04M 1/0249* (2013.01); *A45C 2011/002* (2013.01); *A45C 2011/003* (2013.01); *H04M 1/026* (2013.01); *H04M 1/04* (2013.01); *H04M 1/185* (2013.01)

(58) Field of Classification Search
CPC ........ A45C 2011/003; A45C 2011/002; A45C 13/008; A45C 11/00; H04M 1/18; H04M 1/0249
USPC ....................................................... 206/320
See application file for complete search history.

(56) References Cited

U.S. PATENT DOCUMENTS

| | | | | |
|---|---|---|---|---|
| 5,002,184 A | * | 3/1991 | Lloyd ................... | A45C 11/24 206/305 |
| 5,752,589 A | * | 5/1998 | Berg ........................ | B42F 7/02 190/109 |
| 5,755,329 A | * | 5/1998 | Sadow ................. | A45C 13/021 206/320 |
| 8,915,361 B2 | * | 12/2014 | Rayner ................. | G06F 1/1601 206/320 |
| 8,929,068 B2 | * | 1/2015 | Richardson ........... | G06F 1/1626 361/679.55 |
| 8,958,857 B1 | | 2/2015 | Kennard et al. | |

(Continued)

*Primary Examiner* — King M Chu
(74) *Attorney, Agent, or Firm* — Leydig, Voit & Mayer, Ltd.

(57) ABSTRACT

A Light Floatable Structure is attached to the footprint of a Mobile Electronic Device when near an area where the device might be dropped accidentally into water or other similar liquid where the device might sink. The attached Light Floatable Structure provides the buoyancy needed to prevent the Mobile Electronic Device and attached Light Floatable Structure from sinking. The dimensions and shape of this This Light Floatable Structure are confined to the length and width of the footprint of the Mobile Electronic Device to preserve its feel and adheres to the Mobile Electronic Device with an interface that allows easy attachment and removal of the Light Floatable Structures from the Mobile Electronic Devices when desired.

6 Claims, 7 Drawing Sheets

(56) References Cited

U.S. PATENT DOCUMENTS

| | | | |
|---|---|---|---|
| 2007/0275209 A1* | 11/2007 | Netravali | A47G 27/0206 |
| | | | 428/99 |
| 2011/0284404 A1* | 11/2011 | Peterson | G09F 3/02 |
| | | | 206/223 |
| 2013/0037562 A1* | 2/2013 | Close | A47F 1/126 |
| | | | 221/279 |
| 2014/0110413 A1 | 4/2014 | Kelly et al. | |
| 2016/0262513 A1* | 9/2016 | O'Neill | A45C 11/00 |

\* cited by examiner

FLOAT MOBILE

CROSS-REFERENCE TO RELATED APPLICATIONS

This patent application claims the benefit of U.S. Provisional Patent Application No. 62/413,258, filed Oct. 26, 2016, which is incorporated by reference.

BACKGROUND

Many Mobile Electronic Devices such as cell phones, pads, and various other Mobile Electronic Devices, have a higher specific gravity than water or other liquids they may be dropped into. They therefore sink and become permanently lost. Often such Mobile Electronic Devices are manufactured to be waterproof or water resistant as sold. Alternatively, they may be sealed in a waterproof case or may be sprayed with a waterproof coating such as Liquipel which is known in the art to protect them from being destroyed by contact with liquids.

While some Mobile Electronic Devices do have these ways of being kept waterproof or water resistant, this does not prevent the Mobile Electronic Device from being destroyed or lost by sinking into the liquid. The Prior Art describes some structures that provide a means for keeping a mobile device afloat when dropped in water or other liquids; however, these prior art structures have limitations that restrict the usefulness, portability and even the aesthetic look and feel of the Mobile Electronic Device when these Prior Art devices are attached. In addition, such structures are often bulky and difficult attach and remove from the Mobile Electronic Device to which they are attached.

Specifically, FIG. 1 shows a Life Jacket manufactured by LifeProof and described in U.S. Pat. No. 8,958,857 B1. A Mobile Electronic Device fits into a relatively bulky case to keep the Mobile Electronic Device afloat when the Mobile Electronic Device is dropped into water. Due to its size and dimension, this floatation case is cumbersome and difficult to attach and detach from the Mobile Electronic Device. It is also somewhat inconvenient to store and use the Mobile Electronic Device while the Life Jacket is attached thereto. This same fig. also shows a plan view of the devices of this invention for comparison that is drawn to scale.

Sack like floatation structures in which the Mobile Electronic Device is stored are also know. For example, FIG. 2 illustrates a Floating Waterproof Dry Bag manufactured by Gecko, and described in U.S. Published Application No. 20140110413 A1. The sack is able to keep the Mobile Electronic Device afloat because its volume is much greater than the Mobile Electronic Device that the sack encloses. However, these devices are also awkward and bulky, and do not provide ready access to the Mobile Electronic Device when stored therein. Thus, they are often inconvenient to use. This same fig. also shows a plan view of the devices of this invention for comparison that is drawn to scale. Other dry bags include the Universal Waterproof Case by Homar and the Universal Dry Pouch Bag by Yoshi.

SUMMARY

The present disclosure relates to a Light Floatable Structure that is used an extension of the basic footprint of a Mobile Electronic Device. The Light Floatable Structure is attached to the Mobile Electronic Device so as to preserve the desirable shape of the Mobile Electronic Device with the floatable extension. The floatability of the Light Floatable Structure is achieved by extending the footprint of the Mobile Electronic Device in a single dimension, and preferably, in a vertical (or depth) dimension only, not in the width or length dimensions or in the shape of the Mobile Electronic Device. This Light Floatable Structure is attached to the Mobile Electronic Device using an attachment means such as an adherent that makes it easy to attach and detach the Light Floatable Structure to the Mobile Electronic Device multiple times. By way of example, such adherents include restickable glues, hooks and loops (Velcro), 3M Dual Lock, suction tape, and magnetic tape that are placed on one or both of the apposing faces of the Electronic Device and the Light Floatable Structure that are to be attached and detached by the adherent.

The Light Floatable Structure according to this disclosure is easily and quickly attached and removed from the Mobile Electronic Device. The length and width of the Light Floatable Structure do not extend laterally beyond a rectangular profile boundary that defines a footprint of the Mobile Electronic Device. The Light Floatable Structure may include portals formed therein to expose a camera functions or desired logos of the Mobile Electronic Device. The Light Floatable Structure also incorporates one or more of a multitude of design themes including surfing, fishing, beach, mountains, flower patterns, or other patterns. In general a torsional force is applied to the Light Floatable Structure to detach it from the Mobile Electronic Device, as described in the following embodiments.

The adherents may also be mechanical in nature in that they allow the floatable extension to be attached and detached to the Mobil Electronic Device by an elastic membrane. The elastic membrane is attached to the floatable extension and secures this structure by the attractive force exerted on the Mobile Electronic Device that holds it in place but allows it to be released by stretching the elastic membrane. Other forms of mechanical adherents may include a base plate with fingers that wrap around the edges of the Mobile Electronic Device. This structure is adapted to be easily attached or detached from the Mobile Electronic Device using hand force. The base plate of this structure is then secured to the floatable extension by either a re-attachable or a permanent bond.

Certain of the adherents contemplated by this disclosure are only applied to one of the two surfaces, while others are applied to both surfaces such as hooks and loops for example. Those only applied to the floatable extension provide the advantage that they leave the Mobile Electronic Device free of any adherent structure when detached.

The adherents that are attached to the floatable extension leave an active stickable surface when this structure is detached from the Mobile Electronic Device. This surface is preferably neutralized during storage of the floatable extension. For example, the floatable extension may be placed into a containment structure, such as a pouch, that temperedly neutralizes the active surface during storage. The containment structure is then removed from the structure for attachment to the Mobile Electronic Device.

DESCRIPTION OF PREFERRED EMBODIMENTS

Figure 1:
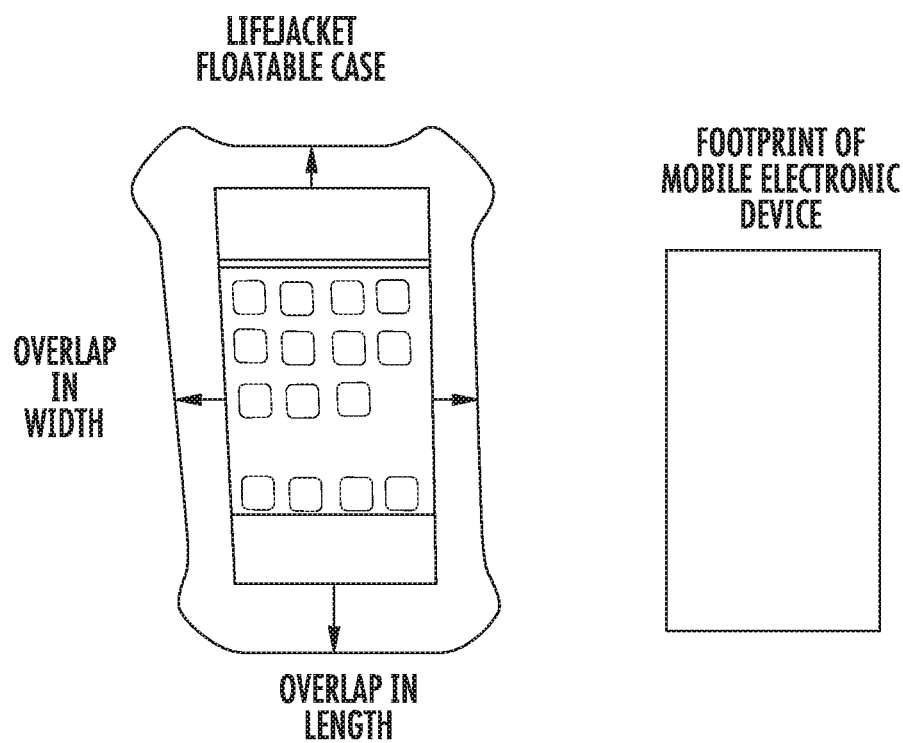
FIG. 1 is a perspective view of (Prior Art) Floatable Extension shown in surrounding relation relative to a Mobile Electronic Device. A similar scaled view of the structure of this invention is shown on this figure for comparison.
Figure 2:
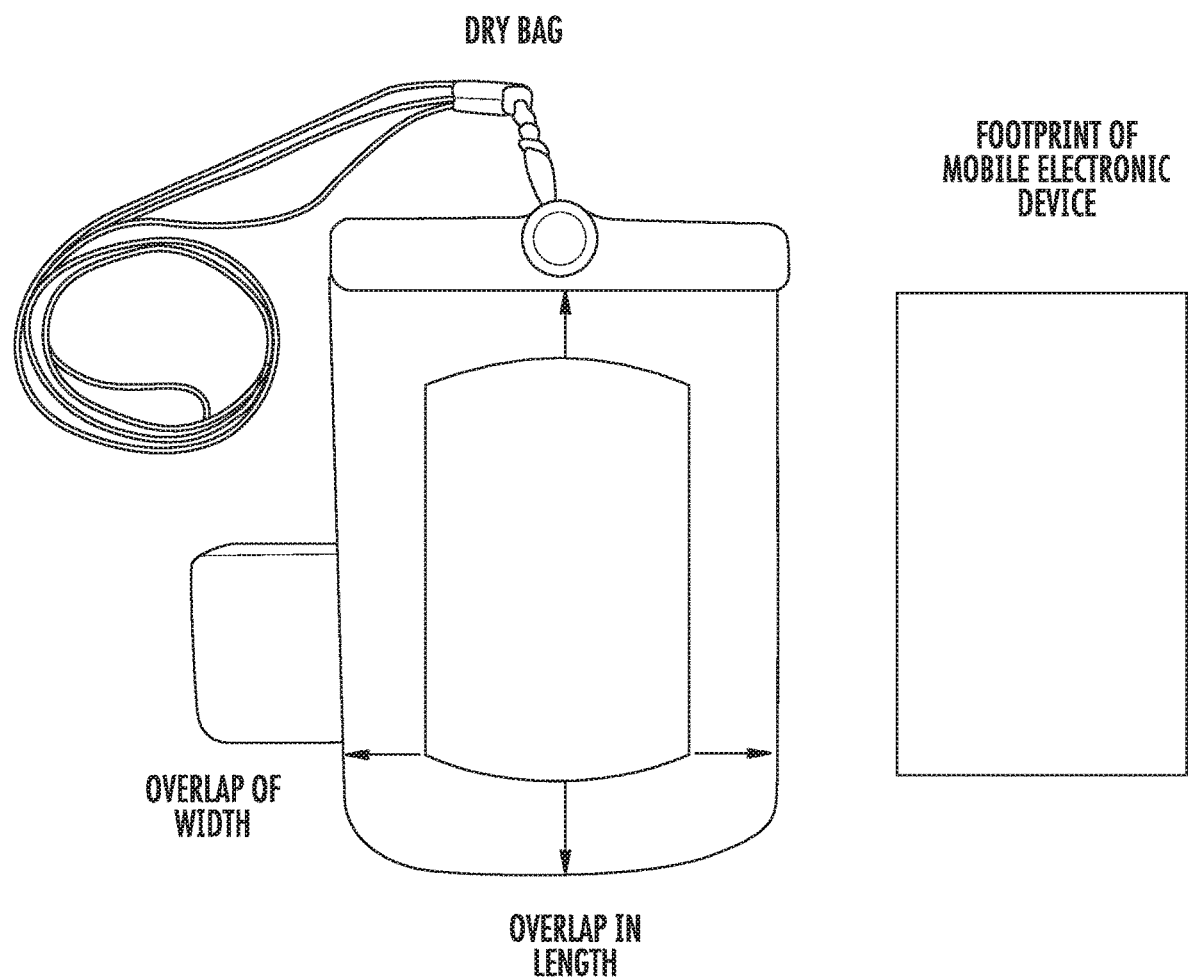
FIG. 2 is a plan view of a (Prior Art) Dry Bag, also shown in surrounding relation relative to a Mobile Electronic Device. A similar scaled view of the structure of this invention is shown on this figure for comparison.

This disclosure relates to a Light Floatable Structure that can be attached to the back cover of a Mobile Electronic Device rendering the composite structure floatable in water or other liquids because the Specific Gravity of the composite structure is less than 1. The shape of Light Floatable Structure conforms to the footprint of the Mobile Electronic Device on which it will be attached and detached in that the sides of Light Floatable Structure do not extend laterally beyond the length or width dimensions of the Mobile Electronic Device.

In a preferred embodiment, the Light Floatable Structure comprises a body of low-density foam or air or other gases to create a composite structure when attached to the Mobile Electronic Device. The thickness of the Light Floatable Structure body is determined by that required to produce a composite structure that has a Specific Gravity that is less than 1. That is, the Light Floatable Structure body has dimensions of width, length that are substantially the same as the width and length of the Mobile Electronic Device. The Light Floatable Structure has a depth Zfe that is sufficient to produce a composite structure having a Specific Gravity less than one which may include portals formed in the Light Floatable Structure) to cause the composite structure to float when dropped into water.

The volume of the Light Floatable Structure was computed using the width W*length L* (which are the same as the width and length of the Mobile Electronic Device) to solve for a depth of the Light Floatable Structure (Zfe). The depth (Zfe) of the Light Floatable Extension is calculated to create a composite structure that floats by forcing the Specific Gravity of this composite to be <1 as illustrated in Sheet 1.

The Specific Gravity of this composite is given in equation (1), $$SG=(Med+Mfe)/(Ved+Vfe), \quad (1)$$

where Med is the mass of the mobile electronic device. In this example, Med=Ded*W*L*Zed, where Ded is the density of Mobile Electronic Device since Ded=Med/Ved. Mfe is the mass of the Light Floating Extension, and is given by the equation (2), $$Mfe=Dfe*(W*L-nAp)*Zfe, \quad (2)$$

where and nAp is n portals each a area Ap.

Ved is the volume of the Mobile Electronic Device. In this example, Ved=W*L*Zed, where Zed is the thickness of the Mobile Electronic Device.

Vfe, on the other hand, is the volume of the Light Floatable Extension. In this example Vfe=(W*L-nAp)Zfe.

The values of Dfe, Ded, L, W and Zed are given in sheet 1, set forth below. From these, a solution for the value of Zfe that will give a SG less than 1, as given by the following equation (3), $$Zfe=(SG*W*L*Zed-Ded*W*L*Zed)/[Dfe*W*L-SG(W*L-nAp)], \quad (3)$$

where the value Zfe is calculated with and without a portal and for various values of SG.

In this example, the total thickness Zt=Zfe+Zed is calculated for inclusion or not of a portal and various values of parameters of the Electronic Device and Floatable Extension. It is clear from examination of this sheet that the density of the Floatable extension has a profound effect on the total thickness Zt of the attached structure. Thus, the value of 0.015 g/ccm, foam can be obtained commercially from suppliers such as Worldwide Foam Ltd. Such Light floatable Extensions can also be produced by constructed of plastic in a rectangular shape with dimensions Wfe, Lfe Zfe sealed along the edges to form a sealed hallow structure, or formed using a 3 dimensional printer that would create an array of closed cells in the shape of Wfe, Lfe. Zfe.

| Sheet 1 | iPhone 5s with portals | iPhone 5s without portals | iPhone 5s Nd = 1, with Dfe = 0 |
|---|---|---|---|
| Total thickness Zfe + Zed (cm) | 1.63 | 1.62 | 1.62 |
| Zfe = Depth of Floatable Extension (cm) | 0.87 | 0.86 | 0.86 |
| SG = Specific Gravity | 0.98 | 0.98 | 0.98 |
| Wed = Width of Electronic Device (cm) | 5.8 | 5.8 | 5.8 |
| Led = Lenth of Electronic Device (cm) | 12.3 | 12.3 | 12.3 |
| Zed = Depth of Electronic Device (cm) | 0.76 | 0.76 | 0.76 |
| Ded = Density of Electronic Device (g/cm^3) | 2.07 | 2.07 | 2.07 |
| Wfe = Width of Floatable Extension (cm) | 5.8 | 5.8 | 5.8 |
| Lfe = Length of Floatable Extension (cm) | 12.3 | 12.3 | 12.3 |
| Dfe = Density of Floatable Extension (g/cm^3) | 0.015 | 0.015 | 0 |
| Np = Number of Portals | 1 | 0 | 1 |

-continued

| Sheet 1 | iPhone 5s with portals | iPhone 5s without portals | iPhone 5s Nd = 1, with Dfe = 0 |
|---|---|---|---|
| Ap = Area of Portals (cm^2) | 1.2 | 1.2 | 1.2 |
| Wp = Width of Portals (cm) | 0.8 | 0.8 | 0.8 |
| Lp = Length of Portals (cm) | 1.5 | 1.5 | 1.5 |
| Weight of phone (g) | 112 | 112 | 112 |

It can also be seen from sheet 1 the effect of a portal on the Zt is also insignificant with this low density Floatable Extension.

The Light Mobile Floatable Structure can be attached and detached from the Mobile Electronic Device multiple times. Attachment of the Light Floatable Structure to the Mobile Electronic Device can be accomplished as described in independent claim 1 and supported using several different adherence materials described in several dependent claims.

Figure 3:
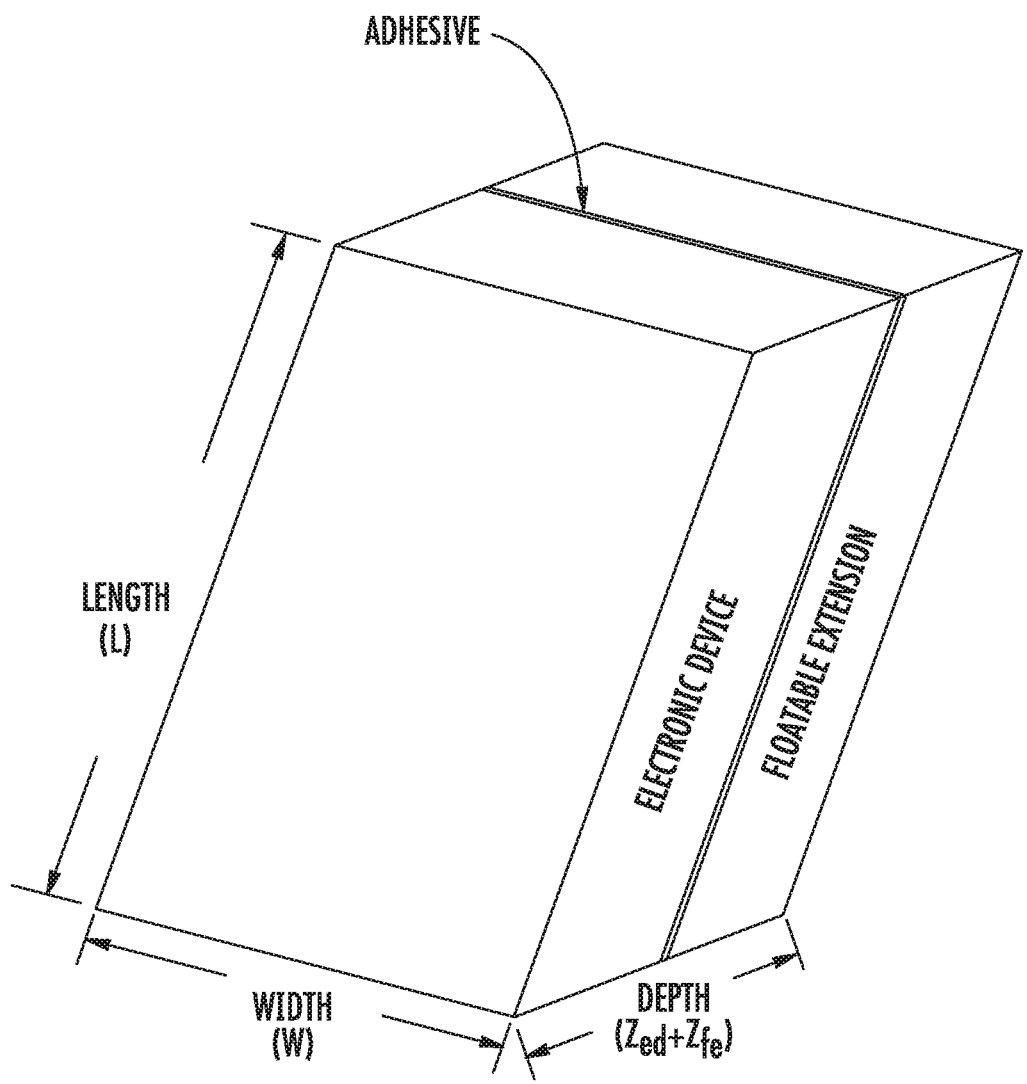
FIG. 3 is an isometric view showing certain features of a Light Floatable Structure according to this disclosure.

The variety of adherence materials that may be used to make the Light Floatable Structure and Mobile Electronic Device detachable with each other include, but are not limited to, restickable glue, magnetic tape, hooks and loops (Velcro), 3M Dual-Lock, and suction tape. Each of these adherence materials can be attached and detached using a hand applied force. The attachment is generally applied as a direct force and detachment is accomplished with an apposing force, where a torsional apposing force is found as most appropriate. These attachment and detachment methods are shown in FIG. 3.

A preferred embodiment of this invention is formed by bonding the Light Floatable Structure and the Mobile Electronic Device using a Restickable glue product such as that made by 3M/Scotch, or Removable Glue Stic by @Removable, or Washable School Glue stik by Elmers. These products provide a bond which allows the composite structure to be dropped in water and float without the bond breaking, but the composite structure can be separated with an appropriate force that allows separation of the Light Floatable Structure from the Mobile Electronic Device at the interface of the two structures, and may be reattached for use multiple times. Restickable glue is a sticky substance that can be sprayed, rolled, or otherwise dispersed onto a surface, making that surface detachable to other surfaces multiple times by applying restickable glue to the base of the Light Floatable Structure. The Light Floatable Structure can then be attached and detached from the Mobile Electronic Device at the plane of the detachable restickable glue.

In another Preferred Embodiment of this disclosure, materials that form a bond to one another when pressed together are used, but may be attached and detached multiple times. Such materials may be used to attach and detach a Light floatable Structure to a Mobile Electronic Device multiple times. Such materials include "hooks and loops" technology to form a temporary, re-bondable interface between the Light Floatable Structure and the mobile device. In this case it is preferable to attach the "loops" to the mobile device and the "hooks" to the Light Floatable Structure because it is softer and less objectionable as part of the detached mobile device than the hooks, but either way of attaching the "hooks and loops" are included in this patent application. "Hooks and loops" certainly meets the criteria of providing a temporary bond between the Light Floatable Structure and the mobile device that allows the composite structure to float when dropped in the water and is detachable and re attachable multiple times.

Figure 4:
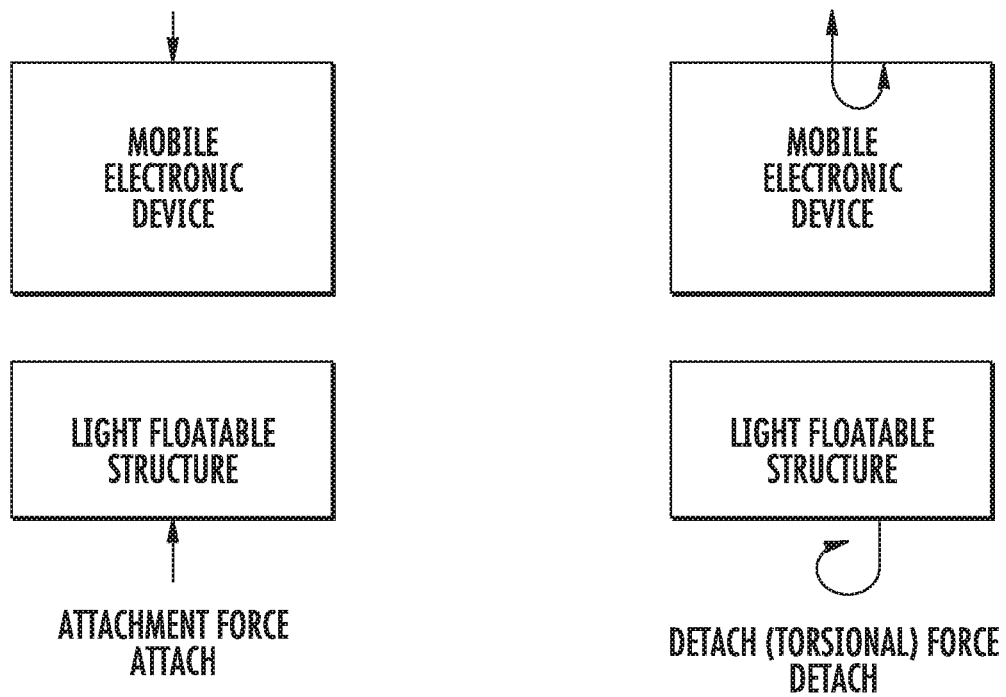
FIG. 4 is a diagrammatic view of the Light Floatable Structure shown in FIG. 3 and a Mobile Electronic Device, together with attach, detach and torsional forces.

Hook and loop materials, such as Velcro and any other hook and loop type materials and 3M Dual-Lock, may be attached to opposing surfaces to be fastened. There are a variety of hook and loop materials that may be used. The hook material consist of many tiny hooks that have been sewn into a flat material, likewise, the loop material consist of many tiny loops sewn into a flat material. The two pieces of material adhere together when the hooks catch in the loops as the two pieces of material are pushed together. After the hooks and loops are attached that can be detached by hand force. There also materials similar to hooks and loops, such as 3M Dual-Lock, that allow to objects to be detachable. By applying the loops material to the back of the Mobile Electronic Device and hooks material to the base of the Light Floatable Structure, the Mobile Electronic Device and the Light Floatable Structure can be attached by allowing the hooks to securely grab the loops and detached by hand force. The 3m Dual-Lock material is a bit different in that the two sides are the same material but attach together by applying a force and detach when an opposite force is applied. The Light Floatable Structure can be attached and detached from the Mobile Electronic Device at the plane of the detachable material as shown in FIG. 4.

In another embodiment, a substance known as suction tape is used to adhere the Mobile Electronic Device to the Light Floatable Structure.

Suction tapes, such as Airstick and Geckskin, have a glue like side to adhere to the surface of an object. The other side of the suction tape consists of many tiny suction cups that allow the object to become detachable to other surfaces. By applying suction tape to the base of the Light Floatable Structure, the Light Floatable structure can be attached to and detached from the back of the Mobile Electronic Device. The Light Floatable Structure can be attached and detached from the Mobile Electronic Device at the plane of the detachable material.

Still another embodiment of the invention is to use a thin magnetic film to adhere the mobile device to the floatable extension. This thin magnetic film can be attached to the bottom of the mobile device and to the top surface of the Light Structure. The Light Floatable Structure can be attached and detached from the Mobile Electronic Device at the plane of the detachable magnetic elements.

In another embodiment, a Magnetic tape has a sticky side and a magnetic side. The sticky side may be attached to the surface of an object leaving the magnetic side exposed. When the magnetic tape is adhered to both surfaces, the two objects may be attached by magnetic force and pulled apart by hand force. By applying magnetic tape to the base of the Light Floatable Structure and the back of the Mobile Electronic Device, the Light Floatable Structure and Mobile Electronic Device can be attached by way of magnetic attraction and detached by hand. The Light Floatable Structure can be attached and detached from the Mobile Electronic Device at the plane of the detachable magnetic materials.

In yet another embodiment, a light superstructure forms the outline of a Light Floatable Structure using a vertical extension of the footprint of the Mobile Electronic Device. This superstructure is formed using a light rigid material that may be attached and detached to the foot of the Mobile Electronic Device using any of the adherent materials described in the other embodiments and other embodiments.

An inflatable balloon is attached to this superstructure that, when inflated, creates a confined air volume that forms the desired Light Floatable Structure. In all of the earlier embodiments, the Light Structure is composed of a light foam material, while in this last embodiment, the Light Floatable Structure is formed from the contents of a balloon and a gas such as air confined by a superstructure rather than the light foam like material in the earlier embodiments. This form of the Light Floatable Structure A simple nozzle that allows a mouth or other gas injector to be used to inflate the balloon. The necessary portal are provided on these balloon devices by marking the balloon in the appropriate locations while deflated and attaching tubes with a water proof glue to the input and exit marked on the locations on the balloon. The superstructure with attached balloon uses one of the attachment materials described in the dependent claims of this application to form a detachable bond to the Mobile Electronic Device for easy attachment and detachment of this device from this Light Floatable Balloon apparatus.

Figure 5:
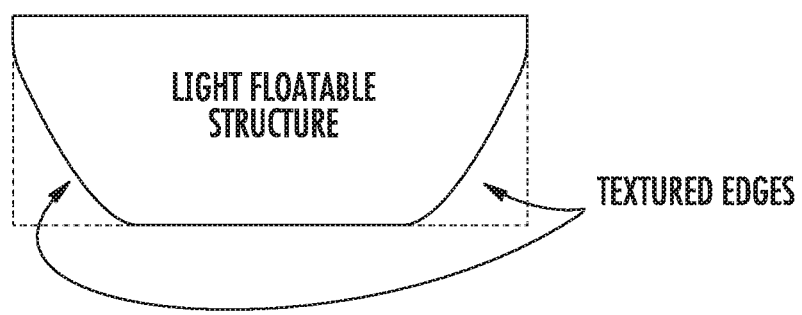
FIG. 5 is a diagrammatic view of a Light Floatable Structure having textured edges according to another embodiment of this disclosure.
Figure 6:
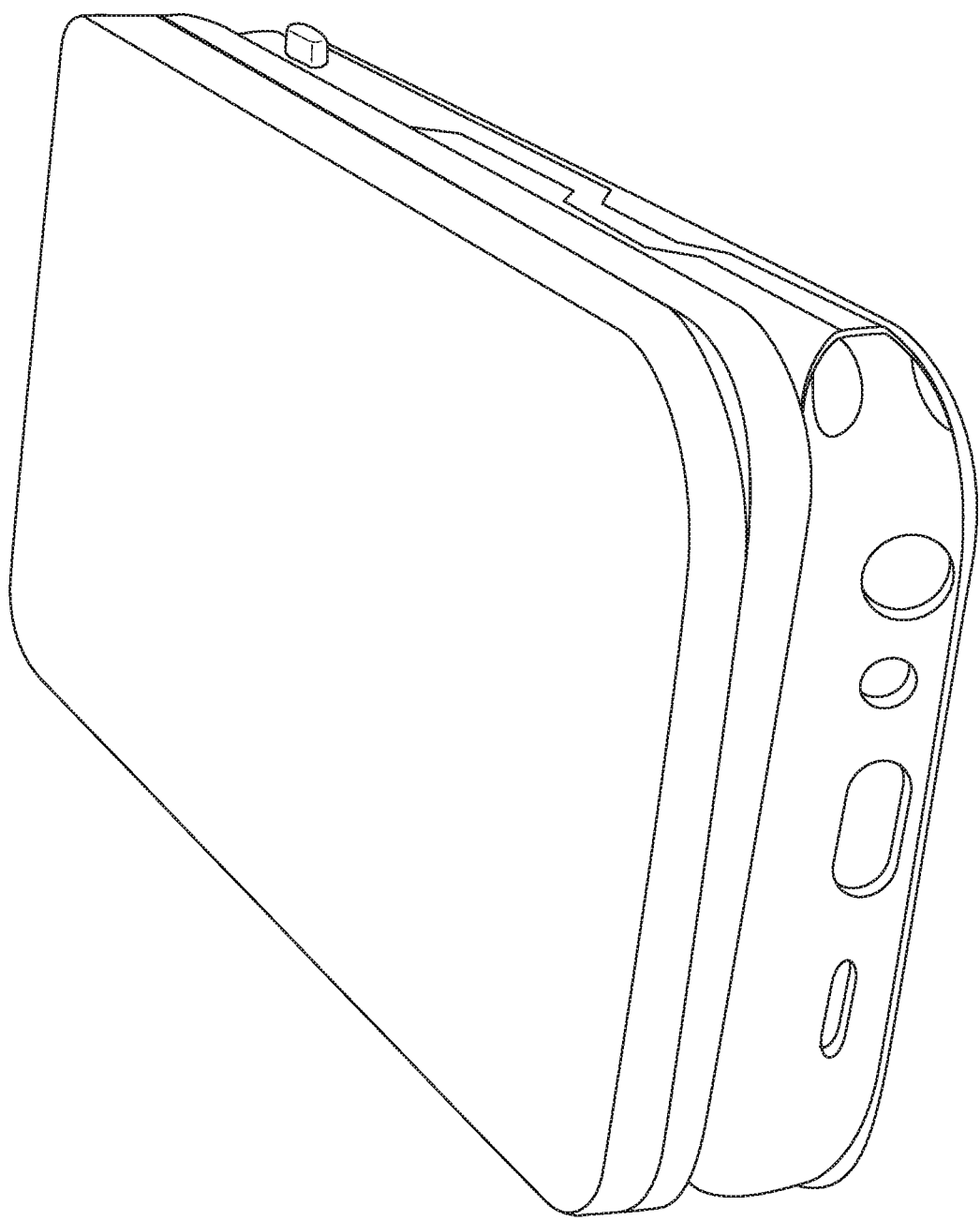
FIG. 6 is a perspective view of the Light Floatable structure showing additional features thereof. In this figure the Mobile Electronic Device is a iPhone 5 in a Incipio water proof case. In this example, a Light Floatable Device was made for a Mobile Electronic Device in the form of an iPhone 5, manufactured by Apple Inc., in an Incipio waterproof case. First, the mass of the Mobile Electronic Device was determined. Next, the depth (Zfe) of the Light Floatable Structure was determined to produce a composite device with a specific gravity less than one. In this example, a light foam with a density of Dfe=0.17 gms/cm$^3$ was selected, while the iPhone 5 in an Incipio water proof case had a density of approximately Dfm=1.59 gms/cm$^3$, which would otherwise sink if dropped in water. The density for the attached composite structure=SG=<1 gms/cm$^3$ which floats. More specifically, to determine the mass and volume of the Mobile Electronic Device, Med, the width, length and thickness of the Mobile Electronic Device (an iPhone 5 in the Incipio case) was measured.
Figure 7:
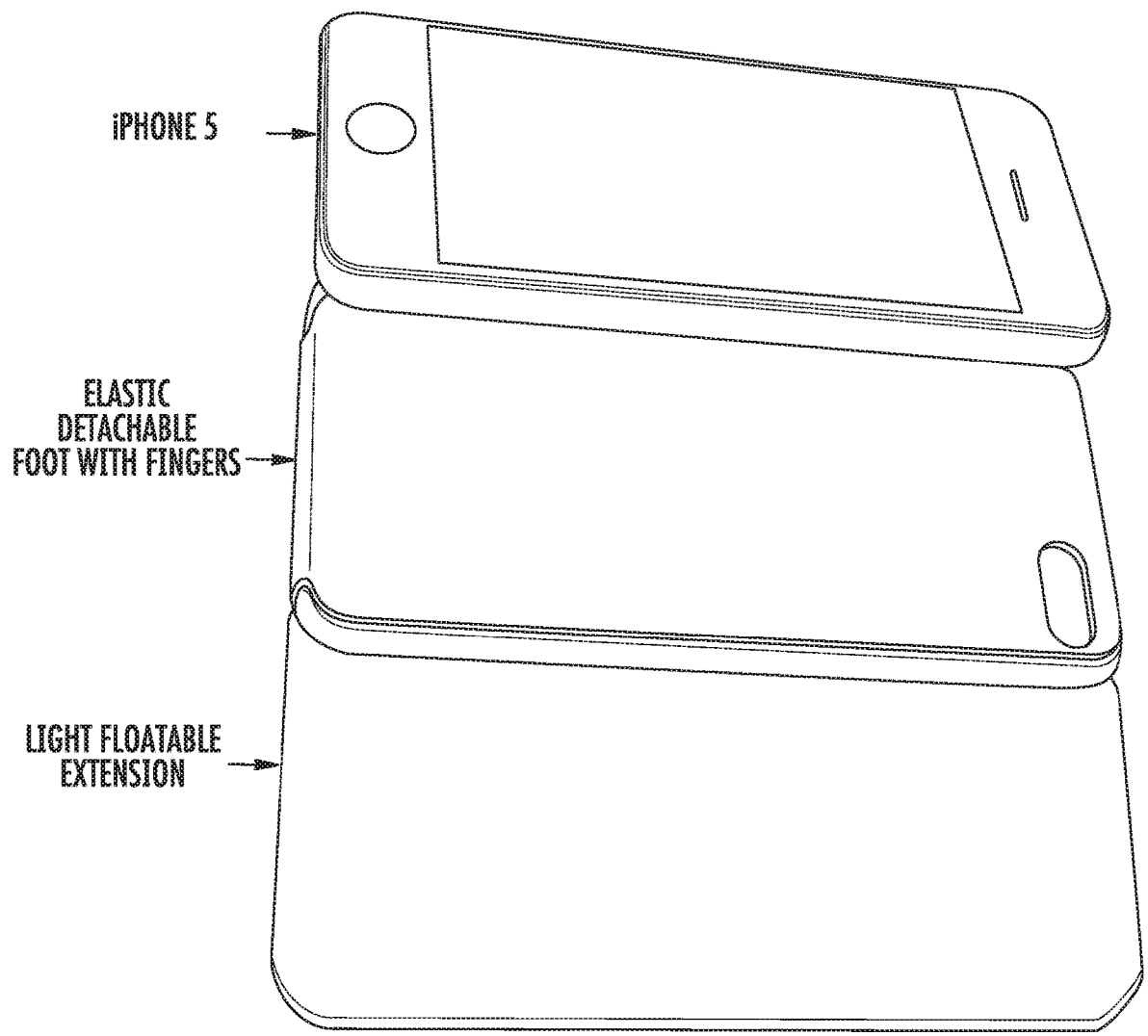
FIG. 7 is an expanded perspective view of the parts of the Light Floatable extension attached to the foot of an elastic detachable foot structure with fingers next to an iPhone 5 phone. This elastic detachable foot with fingers is one of many made for this phone that snaps on and off the phone repeatedly and easily. Such elastic detachable foot structures are sold for all the smart phones and pads, so are well known in the art.

In these embodiments, the shape of the Light Floatable Structure fits the vertical extension of the footprint of the Mobile Electronic Device. The Light Floatable Structure also includes textured edges would be used to avoid shapes that would tend to apply torsional forces to be applied to the composite structure upon entry into water or other liquids. Such textured edges would tend to avoid de bonding the composite structure as illustrated in FIG. 5.

This application is not limited to the devices and Light Structures or the temporary attachable materials described.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A combination comprising:
    a mobile electronic device having generally rectangular device body of a particular mass and volume, the device body including a display surface and a back surface of a length dimension and a width dimension which define an external profile for the device body, and
    a floatation structure comprising a floatation body formed of a low density material having a face surface defined by a length dimension and a width dimension that substantially corresponds to the external profile of the device body, the floatation body further having a thickness of a dimension that defines a volume of the floatation body such that, when the floatation body is attached to the device body, the floatation body and the device body forms a composite structure with a specific gravity less than 1 to thereby allow the mobile electronic device to float when dropped into water, and
    means for detachably securing the face surface of the floatation body to the back surface of the device body including a back cover piece sized to conform to the external profile of the device body and adapted to be placed in contacting relation with the back surface of the device body when the floatation body is detached from the device body to thereby form the composite structure such that the display surface of the device body remains exposed to thereby allow human interaction with the mobile electronic device.

2. The invention of claim 1 wherein the back cover piece is adapted to be placed flush to the back surface of the device body when the floatation body is detached from the back surface of the device body.

3. The invention of claim 2 wherein the thickness of floatation body is less than 1 centimeter.

4. The invention of claim 3 wherein the thickness of floatation body and the device body is approximately 0.76 centimeters.

5. The invention of claim 1 wherein the thickness of floatation body and the device body is less than 2 centimeters.

6. The invention of claim 5 wherein the thickness of floatation body and the device body is approximately 1.6 centimeters.

* * * * *